United States Patent [19]

Dillon

[11] Patent Number: 4,873,742
[45] Date of Patent: Oct. 17, 1989

[54] SAFETY TIE DOWN BAR HAND GRIP SYSTEM

[76] Inventor: Raymond J. Dillon, 13181 Highland Rd., Highland, Md. 20777

[21] Appl. No.: 223,019

[22] Filed: Jul. 22, 1988

[51] Int. Cl.[4] ............................. B25G 1/06; B25G 3/02
[52] U.S. Cl. .................................. 16/111 R; 16/116 R; 16/DIG. 12; 74/551.9; 254/DIG. 3
[58] Field of Search ......... 16/111 R, 116 R, DIG. 12; 81/177.1, 427.5, 489; 254/DIG. 3; 74/551.9; 273/75, 81 R, 81 D, 81.2, 165

[56] References Cited

U.S. PATENT DOCUMENTS

| | | | |
|---|---|---|---|
| 583,781 | 6/1897 | Barber | 74/551.9 |
| 599,359 | 2/1898 | Rockwell | 74/551.9 X |
| 1,461,355 | 7/1923 | Irwin | 254/DIG. 3 X |
| 1,498,602 | 6/1924 | Adell | 254/DIG. 3 X |
| 2,091,458 | 8/1937 | Sleight | 16/111 R X |
| 3,713,350 | 1/1973 | Brilando | 74/551.9 |

Primary Examiner—Nicholas P. Godici
Assistant Examiner—William Scott Andes
Attorney, Agent, or Firm—Morton J. Rosenberg; David I. Klein

[57] ABSTRACT

A safety tie down bar (10) is provided with a handle grip and a protection system (30) for use with a ratcheting winch type tightening device. The safety tie down bar (10) includes a longitudinally extended handle member (20) having a linearly directed section (21) and an angularly directed section (23). Each of sections (21) and (23) includes a ratchet end portion (22) and (24) respectively. Hand grip and protection system (30) includes a plurality of annular sleeves (32, 34 and 36) longitudinally displaced each from the other along handle member (20). First annular sleeve (32) functions alternately as either a hand grip member, when ratchet end portion (24) is inserted within the ratcheting device, or as a means for limiting the insertion depth of ratchet end portion (22). Similarly ratchet stop member (40) is located adjacent the ratchet end portion (24) for either acting as a hand grip member when ratchet end portion (22) is inserted within the tightening device, or serving as a means for limiting the insertion depth of ratchet end portion (24). Both first annular sleeve (32) and ratchet stop member (40) provide a protective resilient cover for portions of handle member (20) likely to be subjected to notching. Additionally, a resilient end cap member (50) is provided to be releasably coupled to either end of handle member (20) to provide a cushion for the exposed end of handle member (20) when the opposing end is inserted within the ratchet type tightening device.

14 Claims, 2 Drawing Sheets

SAFETY TIE DOWN BAR HAND GRIP SYSTEM

BACKGROUND OF THE INVENTION

1. Field of the Invention

This invention directs itself to handle systems for ratcheting winch type tightening devices. In particular, this invention directs itself to a safety tie down bar having a reversible hand grip and protection system which provides a substantially slip resistant hand hold and a means to limit the insertion depth of that portion of the handle inserted in the ratcheting winch type tightening device. More in particular, this invention pertains to safety tie down bars which include substantially slip resistant hand grip members at opposing ends of the handle member. Further, this invention directs itself to resilient hand grip members which can function both as gripping elements and a means to limit the insertion depth of a portion of the handle.

PRIOR ART

Safety tie down bars for use with ratcheting winch type tightening devices are well known in the art. The best prior art known to the Applicant include U.S. Pat. Nos.: 3,978,573; 4,236,427; 3,836,119; 3,314,315; 4,488,706; 4,586,696; 4,275,632; 882,447; 2,913,195; 4,708,320; 4,334,669; 547,716; 1,392,728; 1,169,496; and, 1,444,864.

Some prior art systems such as that shown in U.S. Pat Nos. 3,978,573; 4,236,427; and, 3,836,119 are directed to various tools formed from a single bar which include handle portions and may include L-shaped leg portions or arcuate portions adapted to perform a particular function. Although these devices may provide a handle which is grasped in the hand of the user, they do not provide a hand grip comprising a plurality of sleeve-like members displaced longitudinally with respect to each other to provide distinct raised resilient portions which can be cupped in the hands of the user.

Commercially available tie down bars typically used with ratcheting winch type tightening devices on tractor-trailer transport vehicles adapted for carrying motor vehicles are well known, and have been found to have many problems associated with their use. Access to these tightening devices, with which the tie down bars are used, is often very space limited, requiring the tie down bars to have both linearly directed portions and angularly directed portions, either of which being insertable into the tightening device. The solid steel tie down bars having knurled sections on opposing ends to provide a hand grip. However, these knurled sections typically do not provide sufficient friction to prevent slippage when the user's hands are wet or greasy. Due to the substantially high force applied to the tie down bar during the tightening operation, loss of a secure hand grip on the bar typically causes the bar to be propelled from the ratcheting device, as a projectile these prior art tie down bars can cause injury to the user or damage to the vehicles which are to be transported. One particular source of injury has been the exposed end of the tie down bar, which typically has a sharp edge. Even slippage of the user's grip which does not cause the bar to be propelled from the tightening device has been known to cause injury due to the sharp edge at the end of the bar. Beveling of this edge has also been shown to not solve this problem, as the edge becomes nicked from use, over time, creating a rasp-like edge.

The ratcheting systems with which these prior art tie down bars are used is not provided with any means to limit the insertion depth of the tie down bar, nor is the tie down bar provided with any stops to prevent improper insertion within the tightening device. This situation has led to notching of the tie down bar, where the bar is scored by the ratchet type tightening device structure or the trailer structure to which it is coupled. Even when the tie down bar is inserted properly in the ratchet type tightening device, the exposed tie down bar is subjected to notching by the trailer vehicle structure during the ratcheting operation, in some instances. This notching creates a stress point which can lead to catastrophic failure of the tie down bar during its use. Whereas the invention of the subject Patent Application advantageously overcomes these problems of the prior art devices through the use of a plurality of sleeve like members displaced from one another longitudinally along the length of the tie down bar handle.

SUMMARY OF THE INVENTION

A safety tie down bar for use with the ratcheting tightening device is provided. The safety tie down bar includes a handle member extending in a direction defining a longitudinal axis and having at least one ratchet end section. The safety tie down bar further includes a hand hold system encompassing discrete portions of the handle member for providing a gripping surface on the handle member. The hand hold system includes (1) a plurality of annular hand grip members in a longitudinally displaced relationship each with respect to the other on the handle member, and (2) at least one ratchet stop member located on the ratchet end section. The safety tie down bar also includes an end cap member releasably coupled to an end of the handle member,

DESCRIPTION OF THE PREFERRED EMBODIMENTS

Referring now to FIGS. 1-4, there is shown safety tie down bar 10 having a reversible hand grip and protection system 30 for use with a ratcheting type tightening device. As will be seen in following paragraphs, safety tie down bar 10 is specifically directed to the concept of providing a handle system for a ratcheting type tightening device having the structural integrity to accept the loads applied thereon, provide a slip resistant hand hold and a means to limit the insertion depth of the handle within the ratcheting device. Although not restricted to applications involving the interstate transport of automotive vehicles, safety tie down bar 10 is particularly adapted for use with the ratcheting type tightening devices wherein chains are tightened to secure automotive vehicles to a tractor-trailer for transport, such as to automotive car dealers. In such applications, safety tie down bar 10 provides a superior hand grip for providing a substantially slip resistant hand hold suitable for all weather conditions, as well as a means to prevent improper insertion of the handle member 20 into the tightening device (not shown). Safety tie down bar 10 also provides the means to protect the vehicles being transported from inadvertent scratches and protect the user from injury, through the use of the end cap member 50 which may be releasably coupled to either end of the handle member 20.

Figure 1:
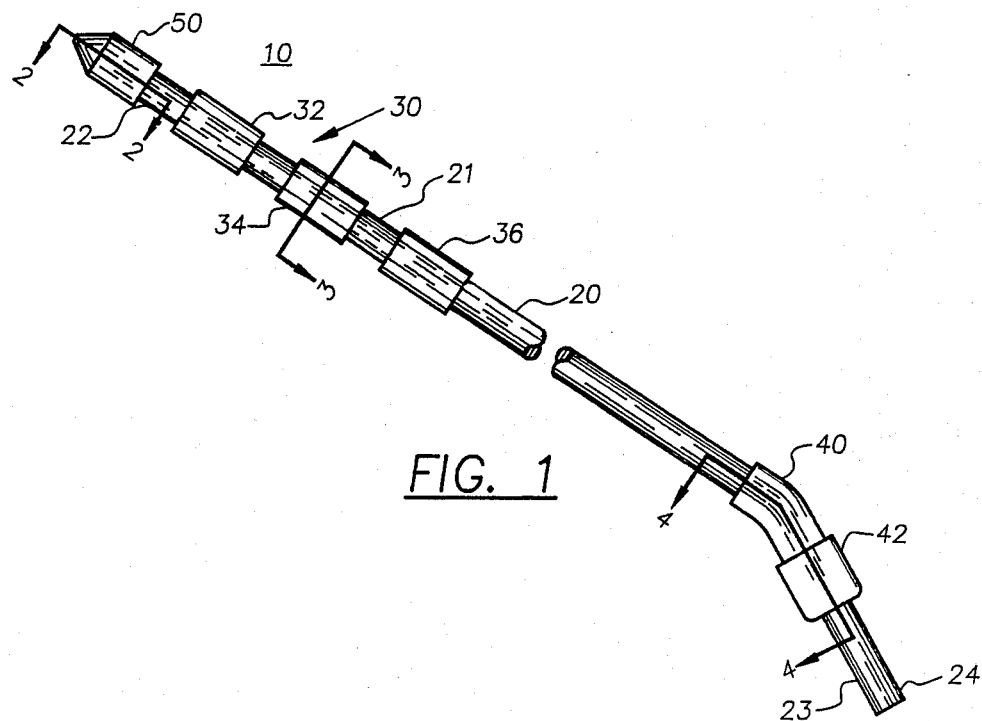
FIG. 1 is a plane view of the safety tie down bar.
Figure 2:
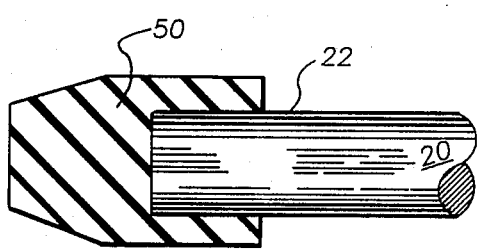
FIG. 2 is a sectional view of the safety tie down bar taken along the section line 2—2 of FIG. 1.

Safety tie down bar 10 includes a handle member 20, as is shown in FIG. 1. FIG. 1 shows a longitudinally extended handle member 20 having a linearly directed section 21 extending from a first end 22 to an angularly directed section 23 located at the second end 24 of handle member 20. Each of the ends 22 and 24 define a ratchet end section of handle member 20 for insertion within the ratcheting tightening device. Handle member 20 is formed of a steel material composition, or some like material having the structural integrity to transmit the required load applied thereon to the winch type ratcheting device, not shown, with which handle member 20 is used. Handle member 20 typically is formed in a cylindrical contour having a tubular or solid rod like structure. Although not important to the inventive concept, handle member 20 may have a polygonal contour, or other shape to properly mate with the ratchet type tightening device.

Figure 3:
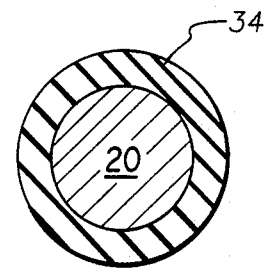
FIG. 3 is a cross-sectional view of the safety tie down bar taken along the section line 3—3 of FIG. 1; and, FIG. 4 is a sectional view of the safety tie down bar taken along the section line 4—4 of FIG. 1.

To provide a slip resistant hand hold, handle member 20 is provided with a hand grip system 30. Hand grip system 30 includes a plurality of annular elastomeric sleeves 32, 34 and 36. As shown in FIG. 3, the elastomeric sleeves 32, 34 and 36 form a cylindrical tubular structure which completely encompasses that portion of handle member 20 which they overlay. Each of the annular sleeves 32, 34 and 36 may be secured to handle member 20 by frictional force between the inner surface of the annular sleeves and the external surface of the handle member 20. Alternately, sleeves 32, 34 and 36 may be adhesively bonded to handle member 20. Each of the annular sleeves 32, 34 and 36 may be formed from natural or synthetic elastomeric materials, such as rubber, silicone, or resilient plastics.

Of particular importance, is the displacement of each of the plurality of annular sleeves relative to one another. This arrangement creates an undulating pattern of raised resilient areas which are easily grasped and substantially slip resistant. In one working embodiment, each of sleeves 32, 34 and 36 have an approximate length of 2.0 inches and are separated one from the other by approximately 3.0 inches. The first annular sleeve 32, in this embodiment, is located approximately 3.25 inches from the end of the ratchet end section 22 of handle member 20. As will be discussed in following paragraphs, first annular sleeve 32 serves a dual function in the reversible hand grip and protection system 30.

Handle member 20 is provided with an angularly directed section 23 having a ratchet end portion 24 for insert into the ratcheting tightening device. Alternately, although not important to the inventive concept, this change in axis for a portion of handle member 20 could be achieved with an arcuate section in place of the angularly directed section 23. The insertion depth into which the ratchet end portion 24 can be placed within the tightening device is limited by a ratchet stop member 40. Ratchet stop member 40 is formed from an elastomeric material like that of the annular sleeves 32, 34 and 36. Similarly ratchet stop member 40 is secured to handle member 20 by frictional or adhesive bonding means. To insure that the insertion depth is limited by ratchet stop member 40, even for those tightening devices having worn and elongated handle receptacles, ratchet stop member 40 is provided with a flange or lip 42 located on one end, adjacent the ratchet end portion 24. Flange or lip 42 may be integrally formed or subsequently added to ratchet stop member 40, by techniques well known in the art.

Figure 4:
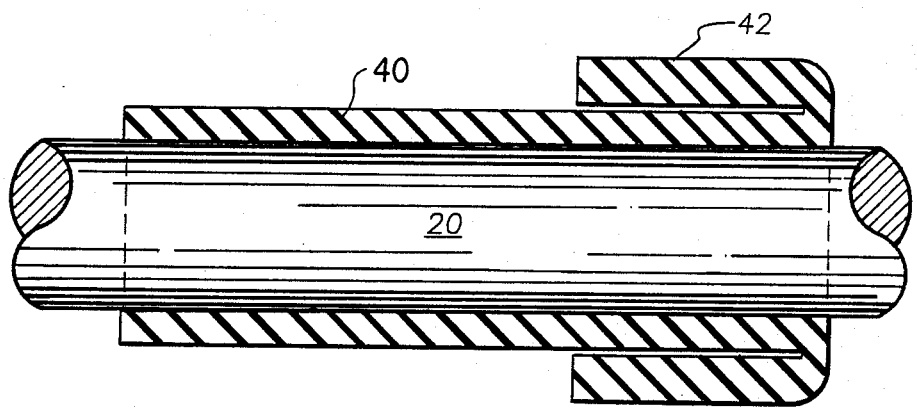

As shown in FIG. 4, the flange or lip 42 of ratchet stop member 40 may be formed by folding back a portion of the cylindrical wall of ratchet stop member 40 back upon itself. Due to the tubular structure of ratchet stop member 40 the folded back portion of 42 tends to be self-retaining, however, the folded back portion 42 may be bonded in the folded back configuration. In one working embodiment, ratchet stop member 30 has an approximate overall length of 3.0 inches, with the folded back portion 42 having an approximate length of 1.0 inches with the flanged end of ratchet stop member 40 being located approximately 3.25 inches from the end of the ratchet end portion 24.

As shown in FIG. 1, ratchet stop member 40 extends from the angularly directed section 23 to the linearly directed section 21, covering the transition therebetween. This is a protective feature of ratchet stop member 40, providing a resilient cover for that region of handle member 20 prone to be notched. This notching occurs in operation of the ratchet type tightening device when the handle member 20 forcibly strikes a portion of the tractor-trailer structure during the ratcheting operation. As is well known in the art, notching of this type can lead to structural failure of the ratchet handle, and therefore its prevention is desirable. Ratchet stop member 40 is designed to provide a resilient cover for that portion of handle member 20 which would otherwise be prone to notching.

When the ratchet end portion 24 is inserted within the ratchet type tightening device the opposing end 22 is provided with an end cap member 50, releasably coupled thereto. End cap member 50 provides a resilient cover for an end of handle member 20 to prevent damage to the automotive vehicles being secured by the winch type ratcheting device as well as protecting the user from potential injury. End cap member 50, formed of a synthetic or natural elastomeric material, has a substantially cylindrical contour which may be closed or open on one end. The opposing end of end cap member 50 is provided with an axial bore for receiving an end of the handle member 20. The bore provided in end cap member 50 is dimensioned to provide a frictional fit with handle member 20 so as to be removable. Cap member 50 may be formed by a tubular sleeve which extends longitudinally beyond the end or adjacent the end of handle member 20 for providing the aforementioned protection.

In some instances, it is required that the ratchet end portion 22 be inserted within the ratcheting tightening device, due to limited clearance for operating the ratcheting device. In these situations, the end cap member 50 is removed from the ratchet end portion 22 and placed over the end of the ratchet end portion 24. With ratchet end portion 22 being inserted within the ratchet type tightening device, first annular sleeve 32 then functions as a ratchet stop member, preventing insertion within the ratchet type tightening device beyond a predetermined dimension. Although not shown in the drawings, annular sleeve 32 may be provided with a folded back flange portion, similar to that described for the ratchet stop member 40.

When ratchet end portion 22 is inserted within the ratchet type tightening device, ratchet stop member 40 then serves the hand grip function for handle member 20. The folded back portion 42 of ratchet stop member 40 provides a relatively short resilient raised portion with which the user's hand can be cupped around. Thus ratchet stop member 40 provides a similar substantially slip resistant hand hold, as provided by the annular sleeves 32, 34 and 36 when ratchet end portion 24 is inserted within the ratchet type tightening device.

Thus, as shown in FIGS. 1-4, the reversible handle grip and protection system as provided by the safety tie down bar 10 for use with a ratcheting winch type tightening device (not shown) provides the functions of (1) a substantially slip resistant hand grip at both ends of handle member 20; (2) a limitation to the insertion depth of handle member 20 within the tightening device; and, (3) protection of critical portions of handle member 20 to prevent notching thereof. Further, the safety tie down bar 10 is provided with an end cap member 50 which may be releasably coupled to either end of handle member 20 to provide a cushioned end surface for preventing damage to the vehicles being secured for transport or injury to the individual using handle member 20.

Each of the annular sleeves 32, 34 and 36 are displaced longitudinally, one from the other, along the length of the linearly directed portion 21 of handle member 20. When ratchet end portion 24 is inserted within the ratcheting type tightening device, annular sleeves 32, 34 and 36 provide raised resilient hand grips about which the user cups his hand to form a substantially slip resistant hand hold. This arrangement is particularly advantageous for providing a gripping surface when handle member 20 is being utilized in foul weather. Alternately when ratchet end portion 22 is inserted within the tightening device the ratchet stop member 40 with its folded end portion 42 provides a similar substantially slip resistant hand hold.

When ratchet end portion 22 of handle member 20 is inserted within the tightening device, first annular sleeve 32 functions to limit the insertion depth of handle member 20 within the tightening device, as is similarly provided by the ratchet stop member 40 when ratchet end portion 24 is inserted therein. As a means to compensate for worn and enlarged handle receiving portions of the ratchet type tightening devices, the end of annular sleeve 32 adjacent ratchet end portion 22 may be provided with a folded back or flange portion as provided and described for ratchet stop member 40. As similarly provided by ratchet stop member 40, first annular sleeve 32 also provides a resilient protective cover for that portion of handle member 20 likely to be notched by the structure of ratchet type tightening device, when ratchet end portion 22 is inserted therein.

The ratcheting winch type tightening device with which safety tie down bar 10 is typically utilized, is generally provided with a flexible member, such as a cable, chain, or strap type band, which is tensioned by radial displacement of handle member 20 about the tightening device's pivotal axis. Occasionally, the angular velocity of handle member 20 during the tensioning of the tightening device's flexible member, can suddenly and rapidly increase, as when the vehicle being secured in unexpectedly displaced by the tensioning operation, or when the flexible member breaks. This unexpected change in the angular velocity of handle member 20 can cause serious injury to the individual operating handle member 20 or damage to the vehicle being secured. To prevent this occurrence, safety tie down bar 10 is provided with the resilient end cap member 50 to provide a cushion for the exposed end of handle member 20. The resilient end cap member 50 is adapted to be releasably coupled to either end of handle member 20 to provide edge protection for the exposed end of handle member 20, regardless of which ratchet end portion 22 or 24 is inserted within the ratchet type tightening device.

As has been described, tie down bar 10 is provided with a reversible hand grip and protection system wherein handle member 20 having ratchet end portions 22 and 24 located on opposing ends, respectively, are each provided with a means to limit the insertion depth thereof. First annular sleeve 32 providing the ratchet stop function for ratchet end portion 22, and ratchet stop member 40 providing the ratchet stop function for ratchet end portion 24. The annular sleeves 32, 34 and 36 function as a substantially slip resistant hand hold for handle member 20 when ratchet end portion 24 is inserted within the tightening device. Conversely when ratchet end portion 22 is inserted within the tightening device, ratchet stop member 40 functions as the substantially slip resistant hand hold. End cap member 50 serves to cushion and enclose the exposed end of handle member 20 when the opposing end is inserted within the tightening device.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A safety tie-down bar hand grip system for use with a ratcheting tightening device, comprising:
    a handle member extending in a direction defining a longitudinal axis and having at least one ratchet end section;
    hand hold means encompassing discrete portions of said tubular handle member for providing a gripping surface on said handle member, said hand hold means including (1) a plurality of annular hand grip members in longitudinally displaced relationship each with respect to the other, and (2) at least one ratchet stop member positionally located on said ratchet end section, said ratchet stop member being formed by a cylindrical wall of predetermined diameter extending between first and second open ends and being positionally located by said first end being longitudinally displaced a predetermined distance from said hand grip members, said second end of said ratchet stop member includes an annular rim portion having a diameter larger than said diameter of said cylindrical wall, said annular rim portion being formed by a portion of said cylindrical wall being folded back upon itself; and,
    an end cap member releasably coupled to an end of said handle member.

2. The safety tie-down bar as recited in claim 1 wherein said handle member has a tubular contour.

3. The safety tie-down bar as recited in claim 1 wherein said handle member is a cylindrically contoured rod-like member.

4. The safety tie-down bar as recited in claim 1 wherein said hand hold means includes at least two hand grip members displaced longitudinally one from the other a predetermined distance for improving the slip resistance of said handle member.

5. The safety tie-down bar as recited in claim 1 wherein said hand grip members have a cylindrical tubular contour for encompassing a portion of said handle member.

6. The safety tie-down bar as recited in claim 5 wherein said hand grip members are formed from an elastomeric material composition.

7. The safety tie-down bar as recited in claim 1 wherein said ratchet stop member and said end cap member are formed of an elastomeric material composition.

8. A reversible handle grip and protection system for use with a ratcheting winch type tightening device, comprising:

a longitudinally extended handle member having a linearly directed section extending from a first end to an angularly directed section located at a second end of said handle member, said first and second ends each being insertable within said tightening device;

gripping means coupled to said handle member for (1) improving the slip resistance of said handle member, and (2) limiting the insertion depth of either end of said handle member within said tightening device, said gripping means includes a plurality of annular elastomeric members having a cylindrical wall, each of said elastomeric members encompassing a portion of said handle member, said plurality of elastomeric members being displaced longitudinally one from the other on said handle member for defining a hand grip, at least two of said elastomeric members each being positionally located proximate in displaced relation with a respective one of said first or second ends of said handle member for (1) limiting the insertion depth of either end of said handle member within said tightening device, and (2) providing a hand grip for an end of said handle member not inserted in said tightening device; and, an end cap member releasably coupled to either said first or second end of said handle member for preventing contact therewith.

9. The reversible handle grip and protection system as recited in claim 8 wherein said ratchet end stops are formed with a flange on an end adjacent said first or second end of said handle member.

10. The reversible handle grip and protection system as recited in claim 9 wherein said flange is formed by folding a portion of said cylindrical wall back upon itself.

11. The reversible handle grip and protection system as recited in claim 8 wherein said handle member is formed in a cylindrical contour.

12. The reversible handle grip and protection system as recited in claim 11 wherein said handle member is formed by a metallic material composition.

13. The reversible handle grip and protection system as recited in claim 8 said end cap member has a closed first end and an open second end adapted for releasable coupling with said first or second ends of said handle member.

14. The reversible handle grip and protection system as recited in claim 13 wherein said end cap member is formed of an elastomeric material composition.

* * * * *